(12) United States Patent
LaFrance-Linden

(10) Patent No.: US 8,739,143 B2
(45) Date of Patent: May 27, 2014

(54) PROFILING METRICS FOR COMPUTER PROGRAMS

(75) Inventor: David LaFrance-Linden, Bedford, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1656 days.

(21) Appl. No.: 11/700,566

(22) Filed: Jan. 31, 2007

(65) Prior Publication Data

US 2008/0184209 A1 Jul. 31, 2008

(51) Int. Cl.
*G06F 9/45* (2006.01)

(52) U.S. Cl.
USPC .......................... 717/154; 717/130; 717/158

(58) Field of Classification Search
None
See application file for complete search history.

(56) References Cited

U.S. PATENT DOCUMENTS

| | | | | |
|---|---|---|---|---|
| 5,701,489 A * | 12/1997 | Bates et al. | | 717/157 |
| 5,828,883 A * | 10/1998 | Hall | | 717/133 |
| 6,029,004 A * | 2/2000 | Bortnikov et al. | | 717/158 |
| 6,728,955 B1 * | 4/2004 | Berry et al. | | 717/158 |
| 6,895,580 B2 * | 5/2005 | Bates et al. | | 717/157 |
| 6,973,417 B1 * | 12/2005 | Maxwell et al. | | 703/2 |
| 7,194,732 B2 * | 3/2007 | Fisher et al. | | 717/131 |
| 7,315,795 B2 * | 1/2008 | Homma | | 702/182 |
| 7,433,803 B2 * | 10/2008 | Circello et al. | | 702/186 |
| 7,496,907 B2 * | 2/2009 | Hind et al. | | 717/158 |
| 7,802,236 B2 * | 9/2010 | Calder et al. | | 717/130 |
| 2002/0124155 A1 * | 9/2002 | Sami et al. | | 712/218 |
| 2002/0129035 A1 * | 9/2002 | Hayes et al. | | 707/104.1 |
| 2003/0018641 A1 * | 1/2003 | Gotwals et al. | | 707/10 |
| 2003/0041316 A1 * | 2/2003 | Hibbeler et al. | | 717/130 |
| 2003/0066055 A1 * | 4/2003 | Spivey | | 717/131 |
| 2004/0230779 A1 * | 11/2004 | Haghighat et al. | | 712/234 |
| 2005/0120341 A1 * | 6/2005 | Blumenthal et al. | | 717/158 |
| 2005/0288961 A1 * | 12/2005 | Tabrizi | | 705/1 |
| 2006/0230390 A1 * | 10/2006 | Alexander et al. | | 717/130 |
| 2007/0294681 A1 * | 12/2007 | Tuck et al. | | 717/149 |
| 2008/0127120 A1 * | 5/2008 | Kosche et al. | | 717/131 |
| 2008/0127149 A1 * | 5/2008 | Kosche et al. | | 717/158 |
| 2009/0144713 A1 * | 6/2009 | Russell et al. | | 717/158 |
| 2009/0217247 A1 * | 8/2009 | Kamigata et al. | | 717/131 |
| 2009/0235241 A1 * | 9/2009 | Luk et al. | | 717/153 |
| 2010/0199266 A1 * | 8/2010 | Warren et al. | | 717/133 |

\* cited by examiner

*Primary Examiner* — Isaac Tecklu

(57) ABSTRACT

Embodiments include methods, apparatus, and systems for profiling metrics for computer programs. One embodiment includes a method that executes a program to obtain data for each of plural entities in the program. Equations are received for plural metrics that define events occurring in the entities. The method then displays scores for each of the entities with respect to each of the metrics in order to visually indicate which of the entities to optimize to improve performance of the program.

18 Claims, 3 Drawing Sheets

| Entity Name | Total WS | Wt Factor | Total Score | Tokens |
|---|---|---|---|---|
| Entity 1 | TWS 1 | WF 1 | TS 1 | Tokens 1 |
| Entity 2 | TWS 2 | WF 2 | TS 2 | Tokens 2 |
| Entity 3 | TWS 3 | WF 3 | TS 3 | Tokens 3 |
| Entity N | TWS N | WF N | TS N | Tokens N |

Profiling Summary

| 400 → | Metric Name 1 (Equation) | | | | |
|---|---|---|---|---|---|
| 410A → | Entity Name | Metric Value | Score | Wt Factor | Wt Score |
| 410B → | Entity 1 | MV 1 | Score 1 | Wt Factor 1 | Wt Score 1 |
| 410C → | Entity 2 | MV 2 | Score 2 | Wt Factor 2 | Wt Score 2 |
| 410D → | Entity 3 | MV 3 | Score 3 | Wt Factor 3 | Wt Score 3 |
|  | Entity N | MV N | Score N | Wt Factor N | Wt Score N |

FIG. 4

| 500 → | Profiling Summary | | | | |
|---|---|---|---|---|---|
| 510A → | Entity Name | Total WS | Wt Factor | Total Score | Tokens |
| 510B → | Entity 1 | TWS 1 | WF 1 | TS 1 | Tokens 1 |
| 510C → | Entity 2 | TWS 2 | WF 2 | TS 2 | Tokens 2 |
| 510D → | Entity 3 | TWS 3 | WF 3 | TS 3 | Tokens 3 |
|  | Entity N | TWS N | WF N | TS N | Tokens N |

FIG. 5

PROFILING METRICS FOR COMPUTER PROGRAMS

BACKGROUND

Computer programmers attempt to write applications and programs so the code optimally executes with no errors or bugs. Programmers often use various tools to assist in writing such code. For instance, after the program is written, it is executed and a debugging tool is used to identify errors or warnings in the program. After the program is debugged, a profiler can be used to collect performance data on the program.

As a program executes, profiles for the program are collected for various routines. Profiles generally represent the time spent in a particular routine or procedure. The process of collecting the time spent in each routine is called profiling. The software tools that collect this information are called profilers.

Profiles of computer programs are useful because they show where performance bottlenecks occur in the program. A profile can show where in the code execution times are long. Programmers then attempt to modify the code in order to increase performance of the program. The process of modifying code based on profiles is called performance optimization.

One problem is that many profilers only sample "processor cycles" that indicate where a program is spending time. The profilers, however, do not indicate why a performance delay is occurring or what is causing the delay. Profilers also do not provide an indication as to whether a given routine or procedure can be optimized or whether such routines are good candidates for performance optimization.

BRIEF DESCRIPTION OF THE DRAWINGS

FIG. 4 is an exemplary output showing entity information for each metric being profiled in accordance with an embodiment of the present invention.

FIG. 5 is an exemplary output showing summaries and totals for each entity being profiled in accordance with an embodiment of the present invention.

DETAILED DESCRIPTION

Figure 1:
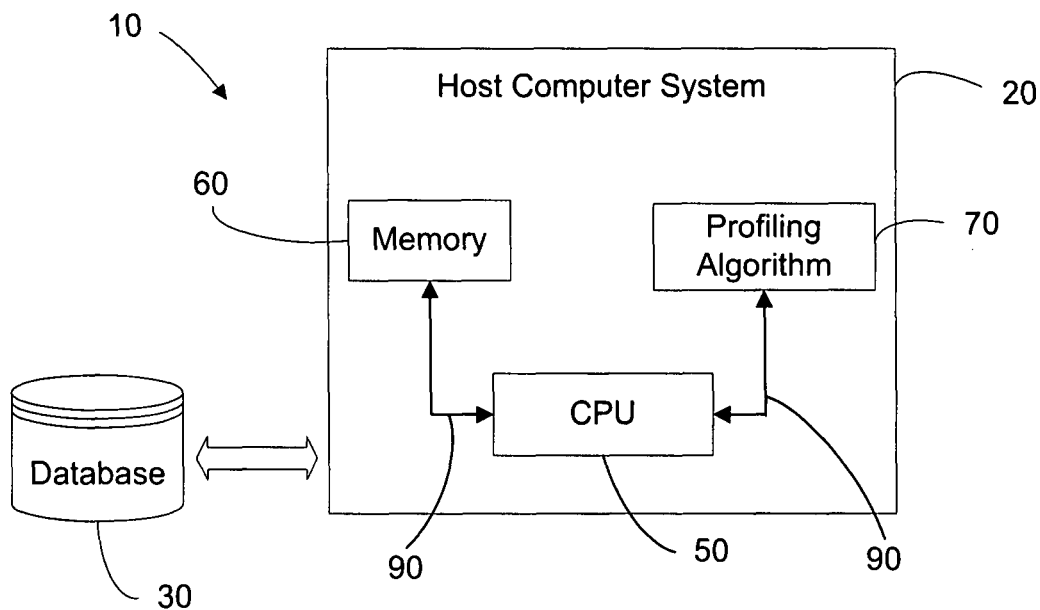
FIG. 1 illustrates an exemplary system in accordance with an embodiment of the present invention.

Exemplary embodiments in accordance with the present invention are directed to systems, methods, and apparatus for profiling metrics for computer programs. Metrics and deductions are automatically derived using a sample-based profiler for computer programs. Exemplary embodiments also sample plural events after a single execution of the computer program and provide guidance toward images and/or procedures. Embodiments are not limited to one counter per run of the computer program from which to obtain data samples and then derive metrics and provide deductions based on metric scores nor are they limited to one run to collect sufficient events for metric derivation.

One exemplary embodiment calculates an extendible set of metrics from plural event counts. The metrics are scored and weighted sums are ranked. A final summary of the scores is presented to a user. The final summary ranks optimization opportunities with hints about items that scored high. The user (example, software developer) is able to use the summary to determine where in the computer program to find potential code that can be optimized. The summary also provides the user with guidance on what metrics should be examined at specified locations (example, routines, procedures, etc.) in the computer program.

In one exemplary embodiment, event counts are obtained from a database. The event counts are divided or separated according to images or procedures in the computer program. Metrics are then defined. By way of example, such metrics include instructions per cycle, cache misses, frequency of memory requests or instruction branches, number of interrupts, success of branch predictions, etc. A determination is made as to how to compute the defined metrics. For instance, the metric "instructions per cycle" is equal to a number of retired instructions divided by a number of cycles. Next, values are determined for each metric and scores are computed for the metrics and entities. The scores and computational results for the metrics and entities are displayed or provided to the user. These results provide guidance for the user (example, software programmer) to optimize the computer program.

One exemplary method proceeds as follows: For each metric, show the abstract name and any additional guidance text, show the equation used, and for each entity show (sorted by weighted score, highest to lowest) the entity name, the metric value, score and the weighted score. Keep track of weighting factors input from a user or otherwise obtained. For each entity, sum the scores and then weight them to arrive at a total weighted score, or sum the weighted scores arriving at a total weighted score. As a summary, for each entity, show (sorted by total weighted score, highest to lowest), the entity name, the total score, the weight, the total final score, followed by (sorted by score, highest to lowest) tokens identifying the contributing metrics and the metrics' score. This last summary not only advises where to look, but with good metrics and scores, shows the relative importance of each entity, and why the entity scored the way it did as an indication what optimization techniques to try.

Exemplary embodiments in accordance with the present invention provide profiles of computer programs. The profiles show where performance bottlenecks occur in the program and why such performance bottleneck is occurring. Exemplary embodiments not only show where in a program to optimize performance but also what to look for in the program (i.e., show the cause of the performance bottleneck). Programmers are provided with guidance on both location and cause to assist in modifying the code in order to increase performance of the program.

FIG. 1 illustrates an exemplary system 10 for profiling metrics for computer programs in accordance with exemplary embodiments. The system 10 includes a host computer system 20 and a repository, warehouse, or database 30. The host computer system 20 comprises a processing unit 50 (such as one or more processors of central processing units, CPUs) for controlling the overall operation of memory 60 (such as random access memory (RAM) for temporary data storage and read only memory (ROM) for permanent data storage) and a profiling algorithm 70 for profiling plural different metrics for a computer program. The memory 60 stores data, control programs, and other data associate with the host computer system 20. In some embodiments, the memory 60 stores the profiling algorithm 70. The processing unit 50 communicates with memory 60, data base 30, profiling algorithm 70, and many other components via buses 90.

Embodiments in accordance with the present invention are not limited to any particular type or number of databases and/or host computer systems. The host computer system, for example, includes various portable and non-portable computers and/or electronic devices. Exemplary host computer systems include, but are not limited to, computers (portable and non-portable), servers, main frame computers, distributed computing devices, laptops, and other electronic devices and systems whether such devices and systems are portable or non-portable.

Figure 2:
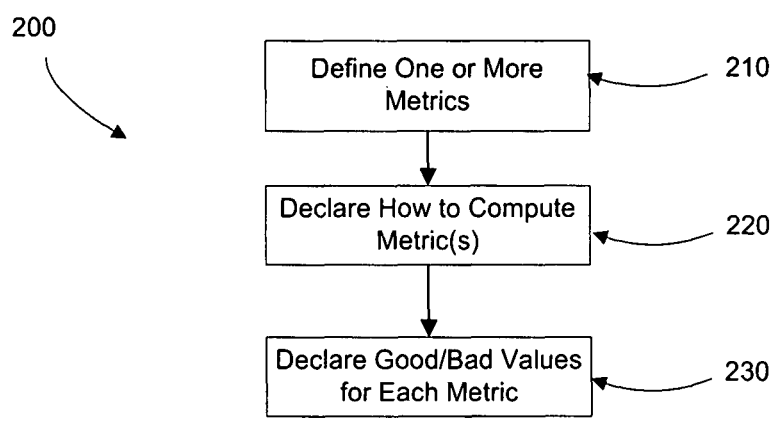
FIG. 2 is an exemplary flow diagram for obtaining definitions for metrics in accordance with an embodiment of the present invention.

FIG. 2 is an exemplary flow diagram for obtaining information for metrics in accordance with an embodiment of the present invention. The information can be obtained or computed from input from a user or computer. For example, a user can enter the information. Alternatively, the information is provided by a software vendor or provided from a computer.

According to block 210, one or more metrics is defined. As used herein, a "metric" is a parameter or measure of a computer program or its specification. Embodiments in accordance with the present invention utilized with a wide variety of metrics including, but not limited to, "Instructions per Cycle" (a low number indicating stalls), "cache misses per instruction" (such as an L3 cache miss that indicates poor cache alignments or an L1 or L2 cache miss), or "should compile with optimization" (in case –O<n> was accidentally omitted during compilation). Other metrics include the following or variations thereof, such as frequency with which memory is accessed, frequency with which cache is accessed, number of instruction branches, number of interrupts occurring, etc. The metrics include other parameters or measures that can provide information on the performance of a program.

According to block 220, a determination or declaration is made as to how to compute the desired metrics and which events are needed to compute the desired metrics. This determination or computation depends on the selected metrics being evaluated. By way of example, the computation for "Instructions per Cycle" is the number of retired instructions divided by the number of cycles. The number of instructions per second for a processor is equal to the instructions per cycle multiplied by the clock speed of the processor (measured in cycles per second or hertz). The number of instructions per second is an approximate indicator of the likely performance of the processor. The computation for "L3 cache misses per instruction" is the number of L3 cache misses divided by the number of (possibly non-NOP) instructions. For "should compile with optimization," the signature is a high fraction of memory loads and stores (to local variables homed to the stack) per (non-NOP) instruction. NOP or "No Operation" instructions in assembly language are instructions that do nothing but expend clock cycles.

According to block 230, a determination or declaration is made for each metric declared in block 220. The declaration provides a relative scale or values to determine when metric computations are good or bad. For each metric, decide what counts as a bad or unacceptable value, and what counts as a good or acceptable value. By way of example, for "Instructions per Cycle," low is bad and high is good. For "L3 cache misses per instruction," high is bad and low is good. Here, the terms low, high, bad, and good are merely provided as a relative illustration; other scales or frames of reference can be used.

Figure 3:
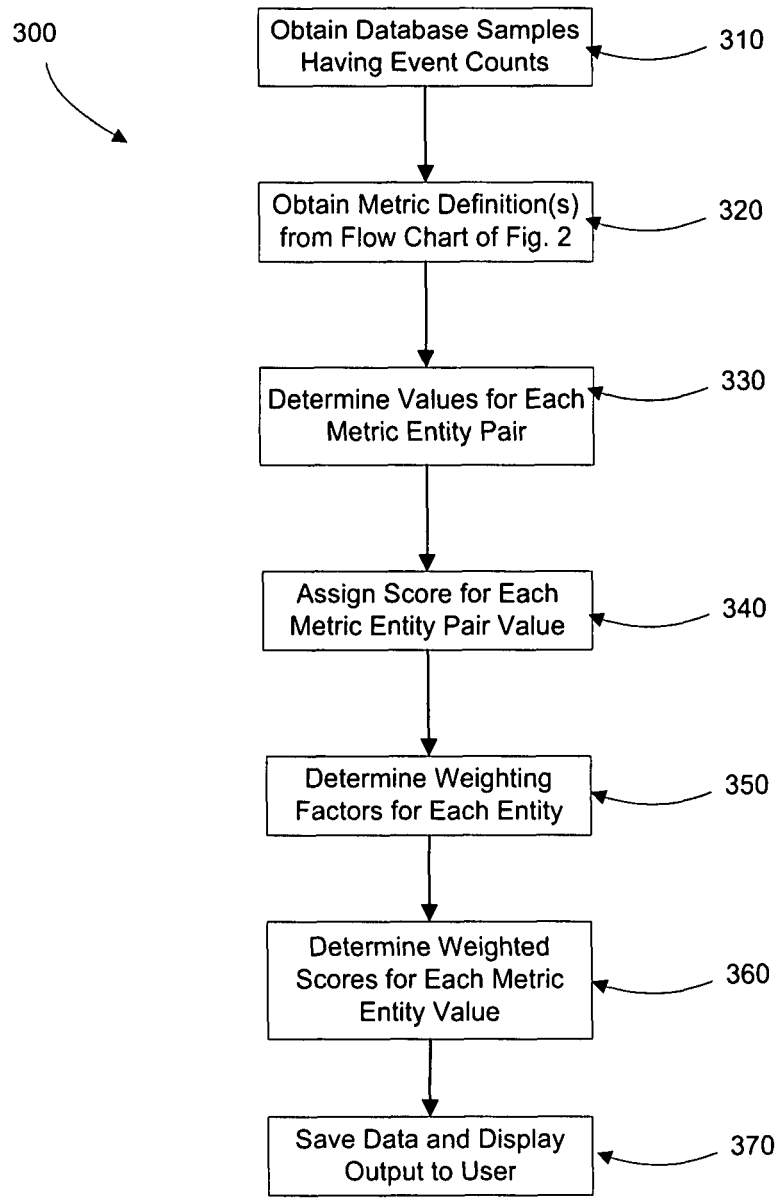
FIG. 3 is an exemplary flow diagram for profiling metrics for computer programs in accordance with an embodiment of the present invention.

FIG. 3 is an exemplary flow diagram 300 for profiling metrics for computer programs in accordance with an embodiment of the present invention. Given the information provided from FIG. 2, flow diagram 300 computes scores for each metric-entity pair.

According to block 310, database samples are obtained that have event counts. Embodiments in accordance with the present invention are not limited to any specific technique for generating profile data. By way of example, such techniques include instrumentation profilers, trace-based profilers, and sampling profilers. Instrumentation profilers recompile the program with special instrumentation "hooks" placed at various branch points. As the instrumented program executes, these hooks cause data counters to be updated so the branch history is recorded. Trace-based profilers collect an execution trace of all the instructions executing in the program. An analysis is performed to determine how often each branch in the program was taken and not taken. A sampling profiler operates using hardware facilities to arrange to record an address of the currently executing instruction.

One exemplary embodiment uses a profiler to perform sampling. By way of example, the profiler probes or queries program counters in the target program at intervals using, for example, operating system interrupts. The process of sampling can include various stages, such as one of more of the following: defining a population to investigate (example, routine, function call, procedure, etc.), specifying a sample frame (i.e., a set of items or events to be measured), specifying a sampling method for selecting items or events from the population, determining sample criteria (such as sample size, sample time, etc.), executing the sampling plan, collecting the data from execution of the plan, reviewing and/or analyzing the data, and providing or displaying the analyzed data to a user or computer.

According to block 320, metric definitions are obtained from the flow chart of FIG. 2. In other words, the declarations of metrics are provided (example, the equations defining the selected metrics and the ranges that classify a range of values from good/acceptable to bad/non-acceptable).

According to block 330, values are determined for each metric-entity pair. Thus, using the declarations defined in block 230, a computation is performed to calculate the values. For example, for each metric-entity pair, calculate whether the pair has a good value or a bad value. By way of example, the value for "Instructions per Cycle" could be very low and deemed "bad" per the declaration of block 230. Alternatively, the value for "Instructions per Cycle" could be high and deemed "good" per the declaration of block 230.

According to block 340, a score is assigned for each metric-entity pair value. By way of example, scores can range from a low number (such as 0 or 1) to a high number (such as 10 or 100).

According to block 350, the weighting factors for each entity are determined. The weighting factors generally provide a utilization of an entity compared to the other entities. In one exemplary embodiment, the sum of the weighting factors is equal to one. Thus, each entity is provided a weighting factor as a percentage of its weight with respect to the other entities. For instance, a routine that is infrequently called in the program can spend a relatively large amount of time waiting to perform memory reads and writes. Even though this routine is infrequently called, it would have a high weighting factor since the amount of time spent in the routine is large. Optimization of this routine could have a significant impact on the overall performance of the program. On the other hand, a routine that is infrequently called and spends little time would have a small weighting factor.

In one exemplary embodiment, an entity (such as an image, routine, function, procedure, etc.) is deemed to be interesting (i.e., worthy of investigation/guidance) if the entity contributes from at least 1% to 10% of total processing time. For example, an entity that consumes 0.1% of processing time would provide little overall significance if this entity were optimized.

According to block 360, the weighted scores for each metric-entity pair are calculated or determined. In one exemplary embodiment, the weighted scores are equal to the score multiplied by the weighting factor. For example, if metric-entity #1 has a score of 9 and a weighting factor of 0.3, then the weighted scores is 9×0.3=2.7.

According to block 370, the calculations are saved and provided or output to a display or computer.

FIG. 4 is an exemplary output 400 showing entity information for each metric being profiled in accordance with an embodiment of the present invention. By way of example, the information is presented in a table. The table includes plural headings (namely, Entity Name, Metric Value, Score, Weighting Factor, and Weighted Score). The corresponding values for each entity are shown in rows 410A-410D. Each metric is provided a name (such as Instructions per Cycle), and the corresponding equation for each metric may be displayed. The Metric Value, Score, Weighting Factor, and Weighted Score are computed as discussed connection with FIGS. 2 and 3.

In one exemplary embodiment, the Weighting Factors are expressed as percentages or decimals. In one exemplary embodiment, the sum of all of the weighting factors is equal to 100% or 1.0. In another exemplary embodiment, the method could remove entities below a certain threshold. For instance, having 1000's of routines each taking up 0.001% of the time are not worth considering, and just create clutter. Further, the Weighted Score is equal to the Score multiplied by the Weighting Factor.

In one exemplary embodiment, the entities are arranged in an order in the table in accordance with their respective scores or weighted scores. For example, Entity 1 has the highest or largest value for Weighted Score; Entity 2 has the second highest or largest value for Weighted Score; etc. In this manner, a user can visually determine which entities have the highest score or relevance for each particular metric. Since Entity 1 has the highest weighted score for a given metric, then a software developer is provided guidance as to which entity to investigate for performance optimization (example, which entity will provide the greatest performance increase).

FIG. 5 is an exemplary output 500 showing summaries and totals for each entity being profiled in accordance with an embodiment of the present invention. By way of example, the information is presented in a table. The table includes plural headings (namely, Entity Name, Total Weighted Score, Weighting Factor, Total Score, and Tokens). The corresponding values for each entity are shown in rows 510A-510D. Here, the Total Weighted Score represents the sum of each weighted score for each metric. In one exemplary embodiment, the Total Weighted Score is equal to the Weighting Factor (column 3) multiplied by the Total Score (column 4). The Tokens show how each contributory metric contributed toward the total score (example, each being between 0 and 10).

In one exemplary embodiment, the entities are arranged in an order in the table in accordance with their respective scores or weighted scores. For example, the entities are sorted from highest to lowest (i.e., most important to least important) based on the total weighted scores. In this manner, a user can visually determine which entities have the highest score or highest relevance for all of the metrics defined for the program. A software developer is provided guidance as to which entity to investigate for performance optimization.

Exemplary embodiments utilize performance analysis that includes the investigation of behavior and performance of a computer program using information obtained while the program runs (i.e., dynamic analysis). Performance analysis attempts to optimize a program for aspects such as speed and memory usage. As used herein, the word "profiler" means a software performance analysis tool that measures the behavior of a program as the program runs. In one exemplary embodiment, profilers measure frequency and duration of function calls and procedures and provide an output that is a stream of recorded events (example, a trace) or a statistical summary of the events that were observed (example, a profile). For instance, as a program executes on a computer, a "profile" of the program is obtained to show the amount of time spent in various routines. Execution times can be attributed to one or more lines of source code, lines of machine code, or functions. Profilers can use one or more of various techniques to collect data, such as hardware interrupts, code instrumentation, operation system hooks, performance counters, etc.

Further, as used herein, the term "optimize" or "optimization" and variations of these terms mean the process of modifying a computer program or computer system to make aspects of the program/system work more efficiently or use less resources. By way of example, embodiments in accordance with the present invention enable a computer program to be optimized so that it executes more quickly and/or operates with a reduced amount of memory storage.

In one exemplary embodiment, the flow diagrams and/or blocks in the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

Exemplary embodiments are illustrated with tables as output in FIGS. 4 and 5. Such output, however, is not limited to tables, but includes a variety of drawings, graphs, and charts, such as pie charts, line charts, histograms, and diagrams, to name a few examples. Further, exemplary embodiments can be table driven so they are easily extended.

The flow diagrams in accordance with exemplary embodiments of the present invention are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software (whether on the host computer system of FIG. 1, a client computer, or elsewhere) will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory, and accessed by the processor using the bus. The techniques and methods for embodying software programming code in memory, on physical media, and/or distributing software code via networks are well known and will not be further discussed herein. Further, various calculations or determinations (such as those discussed in connection with the figures are displayed, for example, on a display) for viewing by a user.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   executing a program to obtain data for each of a plurality of routines in the program;
   accessing equations to compute metrics that define events occurring in the routines, wherein the equations declare ranges of the computed metrics that are acceptable;
   using the accessed equations to compute values for the obtained data and to determine whether the computed values of the obtained data are within the declared acceptable ranges;
   assigning a score to the computed values for each of the routines;
   determining a weight for each of the routines;
   for each of the routines, calculating a weighted score equal to the assigned score multiplied by the weight; and
   displaying the weighted scores of the routines executed in the program to visually indicate which of the routines to optimize to improve performance of the program.

2. The method of claim 1 further comprising, ranking from highest to lowest the routines in a table based on the weighted scores.

3. The method of claim 1, wherein the metrics include (1) cache misses per instruction in the program and (2) instructions per cycle in the program.

4. The method of claim 1 further comprising, declaring a range of values for each of the metrics.

5. The method of claim 1 further comprising:
   profiling the program to determine an amount of processing time spent in each of the routines;
   pairing each of the metrics with each of the routines to develop plural procedure-metric pairs;
   calculating a score for each of the plural procedure-metric pairs.

6. A non-transitory computer readable medium having instructions which when executed cause a computer to:
   execute a computer program that has routines;
   obtain database samples having plural event counts for the routines executed in the computer program;
   access equations to compute metrics that define events occurring in the routines, wherein the equations declare ranges of the computed metrics that are acceptable, the computed metrics having metric definitions that include one of (1) instructions per cycle and (2) cache misses;
   using the accessed equations to compute values for the obtained database samples and to determine whether the computed values of the obtained data samples are within the declared acceptable ranges;
   assign a score to the computed values for each of the routines;
   determining a weighting factor for each of the routines;
   for each of the routines, calculating a weighted score equal to the assigned score multiplied by the weighting factor; and
   displaying the weighted scores of the computed values for the routines.

7. The computer readable medium of claim 6 wherein determining the weighting factor is based on amounts of time the routines spend performing read and write operations in the computer program.

8. The computer readable medium of claim 6 further comprising, receiving as input from a user the metric definitions.

9. The computer readable medium of claim 6 further comprising, simultaneously displaying in a table a name of each of the routines and the weighted score for each of the routines.

10. The computer readable medium of claim 6 further comprising, sorting the scored routines from highest score to lowest score for each of the routines.

11. The computer readable medium of claim 6, wherein the computer program is executed a single time to obtain the database samples having the plural event counts.

12. The computer readable medium of claim 6 wherein determining the weighting factor is based on how frequently a routine is called and how much time for the routine to perform memory reads and writes.

13. The computer readable medium of claim 6 further comprising, displaying the scored routines in a table that places the routines in an order based on a score of each routine.

14. A computer, comprising:
   a memory to store machine readable instructions to identify routines of a computer program that are to be optimized to improve performance of the computer program; and
   a processor to execute the machine readable instructions to:
      obtain data samples from a database for the routines of the computer program;
      access equations to compute metrics that define events occurring in the routines, wherein the equations declare ranges of the computed metrics that are acceptable;
      use the accessed equations to compute values for the obtained data samples and to determine whether the computed values of the obtained data samples are within the declared acceptable ranges;
      assign a score to the computed values for each of the routines;
      determining a weight for each of the routines;
      for each of the routines, calculating a weighted score equal to the assigned score multiplied by the weight; and
      display the weighted scores of the routines to visually indicate which of the routines to optimize to improve performance of the computer program.

15. The computer of claim 14, wherein the processor is further to execute the machine readable instructions to profile the computer program to obtain information on an amount of time the routines execute instructions.

16. The computer of claim 14, wherein the plural metrics include instructions per cycle and cache misses per instruction that occurred in the routines of the computer program.

17. The computer of claim 14, wherein the processor is further to execute the machine readable instructions to determine how much processing time is spent executing the routines of the computer program.

18. The computer of claim 14, wherein the processor is further to execute the machine readable instructions to rank the routines according to whether the routines require performance optimization.

\* \* \* \* \*